Aug. 20, 1946.   O. M. BURKHARDT   2,405,940
SELECTOR COCK
Filed April 14, 1943   2 Sheets-Sheet 1
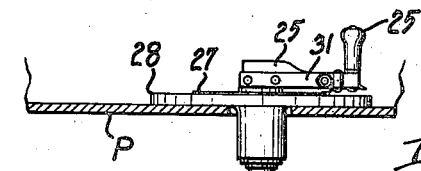
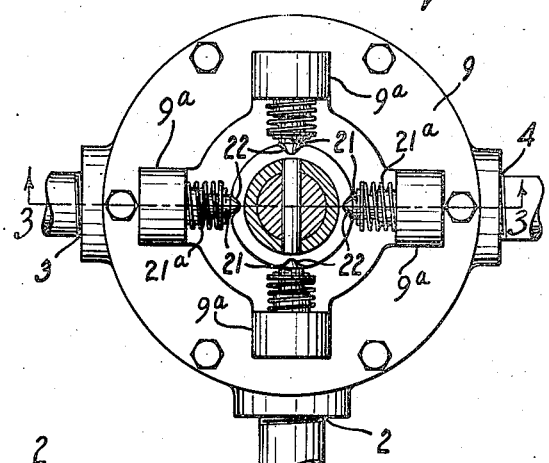
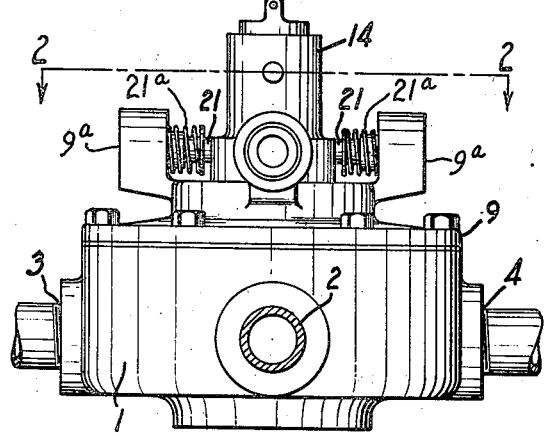
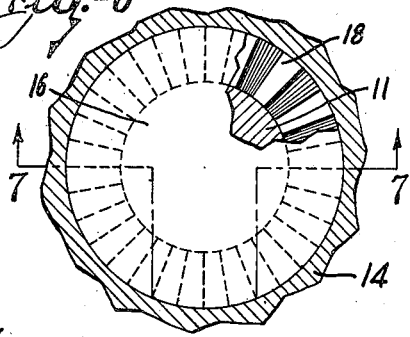
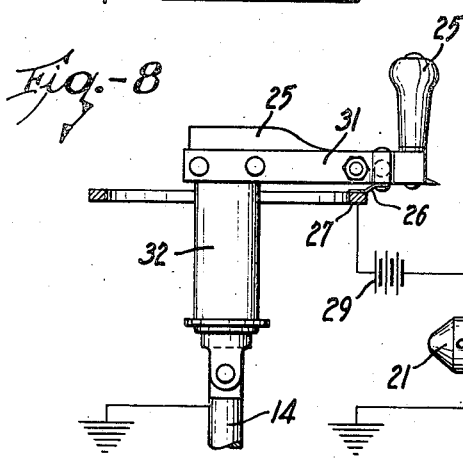
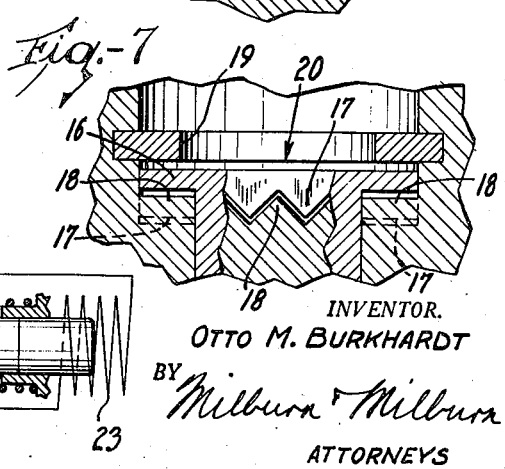
INVENTOR.
OTTO M. BURKHARDT
BY Milburn & Milburn
ATTORNEYS Aug. 20, 1946.  O. M. BURKHARDT  2,405,940
SELECTOR COCK
Filed April 14, 1943   2 Sheets-Sheet 2

INVENTOR.
OTTO M. BURKHARDT
BY
Milburn & Milburn
ATTORNEYS.

Patented Aug. 20, 1946

2,405,940

UNITED STATES PATENT OFFICE 2,405,940

SELECTOR COCK

Otto M. Burkhardt, Euclid, Ohio

Application April 14, 1943, Serial No. 483,033

9 Claims. (Cl. 251—97)

1

This invention relates to the art of selector cocks for controlling the flow of liquids.

The prior art contains cocks for selectively controlling the flow of liquids from one or more supply lines to an outlet for use or for drainage, as found for instance in the U. S. Letters Patent to Koehler Nos. 2,226,169 and 2,233,840; and it is well known that such a control device requires efficient sealing means in order to prevent leaking at any time, even under high pressures. This involves sealing means of a resilient nature but experience has shown that such selector cocks require considerable effort to manipulate and, for this reason, auxiliary means have been employed for the purpose of reducing the pressure between the sealing surfaces, thereby reducing the turning effort as well as wear and distortion of the resilient sealing means.

When used on modern aircraft, these selector cocks are usually so located that a remote control means has to be adopted; and, in order to employ a simple and light form of such control mechanism, it is necessary that the selector cock require only a minimum of effort to operate it. It should be noted also that in modern aircraft fire hazard alone makes the requirements extremely rigid as to the seal against gasoline leakage at any time.

It is also desirable that there be some means for automatically arresting the selector cock in certain predetermined positions so as to indicate when such particular positions have been established, as for instance when a particular feed line has been brought into registry with the outlet or has been shut off. No prior attempts to accomplish such object have yet proved entirely satisfactory, so far as I am aware. One serious difficulty with such prior devices is that very often the edges of the ports in the cock cut the sealing surface edges or cause waves and distortion and hence leakage.

Having in mind the requirements of such a device, my present invention is designed to accomplish several specific objects.

One object of my invention is to provide such a device in which the change from one selected position to another can be made with a minimum of effort.

Another object is to provide such a device in which such change can be made with a minimum loss of liquid, even under considerable pressure in the line or lines.

Another object is to provide such a device with an improved form of sealing means for the cock.

Another object is to provide such a device with

2 improved means for partially and controllably releasing the sealing engagement of the cock during the adjustment thereof and for automatically returning the cock to fully sealing engagement in such manner as to facilitate the adjusting movement of the cock and to limit such release to an exact amount so as to maintain proper sealing effect at all times, even during such adjusting movement of the cock.

Another object is to provide such a device with improved means for automatically determining and indicating when the particular adjusted position has been accomplished.

Another object is to provide such a device that is of simple construction, can be easily manufactured, installed, removed and repaired, and is dependable in its action under all normal circumstances.

Other objects will appear from the following description and claims when considered together with the accompanying drawings.

Fig. 1 is a view illustrating the general organization of my improved selector cock and the control means therefor;

Fig. 2 is a top plan view of the selector cock itself;

Fig. 6 is a view taken on line 6—6 of Fig. 3;

Fig. 7 is a view taken on line 7—7 of Fig. 6; and

Fig. 8 is a view, mostly diagrammatic, illustrating the electric control means for the solenoids of the plungers.

Figure 3:
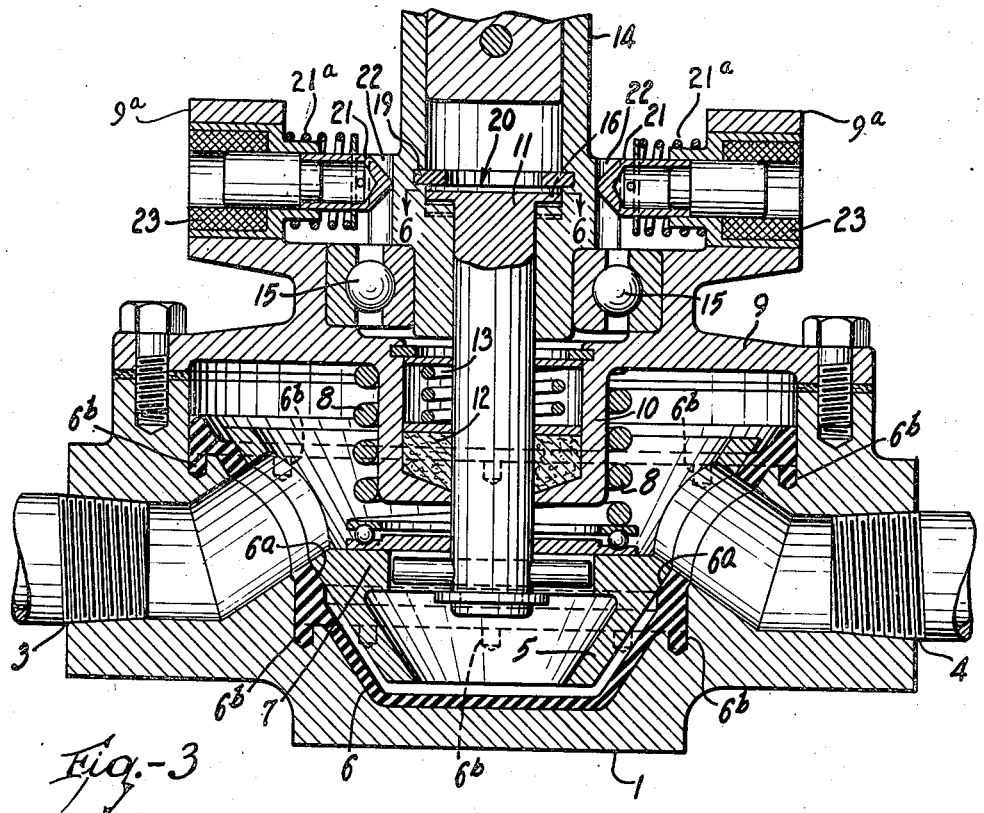
Fig. 3 is a view taken on line 3—3 of Fig. 2.

It is to be understood that the present form of disclosure is merely for the purpose of illustration and that there might be devised various modifications thereof without departing from the spirit of my invention as herein set forth and claimed.

The main housing 1 has the threaded ports 2 and 3, respectively, for connection of tubing for the liquid from the supply tanks, and the threaded outlet port 4 for connection of its tubing. These ports are adapted to be controlled by the cone-shaped cock 5 which may be of metal and has suitably spaced openings therethrough for registry with the ports 2, 3 and 4. The inner face of the housing has secured thereto a continuous annular facing of suitable flexible sealing material 6, as for instance synthetic rubber, which is formed with a continuous annular band portion of increased thickness, as indicated at 6a, for the purpose of effecting a better sealing engagement; and this portion 6a has openings therethrough in registry with the ports 2, 3 and 4. The thickened portion 6a, being unconfined, provides also a means of effecting a kneading action in the synthetic rubber, which preserves its flexibility and hence its life of usefulness by preventing undue wear or deformation of the same, as will more fully appear from the following. The sealing material 6 is formed with the dowel portions 6b which seat in corresponding recesses in the housing and thus provide means for holding the sealing material more securely in position.

The cock 5, which is of hollow form, has a transverse web 7 extending across the inside thereof approximately midway of the height thereof; and this web serves, with suitable bearing, as the lower abutment for the coil spring 8 which serves normally to hold the cock in closed position, the upper end of this spring having abutment against the under-side of the cover 9 bolted upon the housing 1. The central part of the cover 9 is formed as a well 10 which serves to centre the coil spring 8 and which serves also another purpose to be mentioned.

The cock-operating stem 11 has its lower end provided preferably with a suitable form of swivel connection to the cock 5 and extends upwardly through the well 10 within which is provided the packing 12 for the shaft 11 and the coil spring 13 therefor. The lower end of the hollow manipulating shaft 14 surrounds the stem 11 and has rotatable supporting engagement upon the ball or plain bearing 15 within the suitably formed cover 9.

The upper end of the stem 11 has an annular flange 16 with the under-side thereof formed with a regular series of serrations or notches 17 of plain wedge-like form entirely thereabout for co-operation with companion plain wedge-like notches or serrations 18 formed continuously about the upper side of an annular seat formed within manipulating shaft 14. There is suitable clearance provided between serrations 17 and 18 when these parts occupy idle position, so as not to prevent cock 5 from being lowered fully upon its seat, this provision of clearance being indicated in the present drawings, especially in Fig. 7. These companion serrations 17 and 18 are so formed that, upon rotatable movement of manipulating shaft 14, the wedging engagement of its serrations 18 with companion serrations 17 will serve to lift the stem 11 and the cock 5 carried thereby so as to relieve part of the pressure upon the sealing medium. However, such axial movement of the stem 11 is comparatively slight and is limited in its extent by the engagement of the upper side of the flange 16 with the ring 19 that is fixed within the hollow shaft 14. The slight extent of upward movement of the stem 11 is determined by the clearance 20 which is made slightly less than the yield of the sealing means under the existing pressure, this clearance being carefully calculated so as to be suitable for relieving the compression of the cock 5 against the resilient sealing material 6. Because of the presence of liquid and the lowered sealing pressure, there will be a film of moisture between the cock and the sealing material and this will help to reduce the high coefficient of static friction between the sealing surfaces and consequently reduce the friction between the face of the cock 5 and the surface of the sealing means 6 preparatory to and during the rotative movement of the cock 5 for opening or closing the same; but the contactual engagement between the cock 5 and the sealing material 6 is not reduced enough to destroy the sealing engagement therebetween at any time. That is to say, there is always maintained an effective seal in the seating of the cock but the pressure between these interengaging surfaces is greater while the cock is in fully lowered position, whether open or closed, and is less while the cock is being moved from one position to another so as to thereby preclude the danger of tearing, cutting or otherwise deforming the sealing means and destroying the sealing effect thereof; but the reduction in pressure is limited and may be equal to or less than but never more than the yield of the sealing means in order to prevent leakage. Also, such temporary reduction in the pressure of the cock 5 upon the sealing means 6 serves to reduce the resistance to the turning movement of the cock, as will more fully appear from the following.

By having the thickened portion 6a of the sealing material unconfined, it is free to yield under the closing pressure of the cock and likewise, after yielding, it can return towards normal condition when the cock 5 is raised, but without disturbing the seal at any time. Moreover, there is thus obtained a kneading action which in actual practice has been found to prolong the usefulness of the sealing material and to contribute to its sealing effect at all times, whether the cock be open or closed.

The cock 5 is definitely located and securely held in its predetermined positions by means of the laterally arranged arresting spring plungers 21 which are mounted in the housing portions 9a provided upon the cover 9 and are adapted to have their inner ends engage in the notches or depressions 22 provided at corresponding intervals about the shaft 14. In the present form of illustration, there are four such notches 22 and the same number of arresting plungers 21 spaced the same distance apart as are the notches 22 so as to be capable of registering engagement therewith, but it is to be understood that there may be provided any number of sets of notches and plungers. The spacing of these sets of plungers and notches corresponds with the predetermined positions of the cock 5.

According to the present form of disclosure, there are three ports provided in the housing and the same number of ports in the cock 5 so as to permit communication to be established through different combinations of ports in the cock and the casing and thereby connect one or two of the supply tanks with the outlet pipe for delivery to the engine, for instance, as may be desired and as will be readily understood by those who are familiar with the art to which this invention relates.

Now, in order to effect rotative adjustment of the cock 5, it is expedient and desirable to relieve several elements of resistance to such turning movement. First, the resistance between the surfaces of the cock and the sealing material; and second, the resistance due to the engagement of the arresting plungers within their notches. The first element of resistance can be more easily overcome if the cock 5 be lifted to an extent corresponding to the amount of the yield of the sealing means, as above referred to; and the second element of resistance can be entirely eliminated by withdrawing the plungers 21, as will be explained.

Then, with these several factors and considerations in mind, I have made my present provisions so as to better adapt such a device for remote control, as for instance in the case of aircraft, as above explained. That is to say, I have here provided an improved form of sealing engagement at the several ports; I have provided means for momentarily withdrawing the spring arresting plungers from engaging position upon initiation of the rotative adjusting movement; and I have devised an effective notch or serration means of interengagement between the operating shaft 14 and the stem of the cock 5 as a means for raising the cock and thereby relieving the compression of the sealing material preparatory to adjustment of the cock 5. Incidentally, I have provided also a means for limiting the raising of the cock 5 to an extent that may be equal to or a little less than but never more than the amount of the axial yield of the sealing means, such limitation being essential to prevent the cock 5 at any time from being lifted entirely free from its sealing means, which of course would cause leakage of the liquid. With these several inter-related features of improvement, I not only facilitate the rotative adjustment of the cock in a highly efficient manner but there is also ensured the seating of the cock in a positive and dependable manner. These are the features which constitute my present invention, together with any and all auxiliary features of construction and arrangement which are involved therein.

My means for momentarily withdrawing the arresting plungers 21 from their notches or seats 22, consists of the solenoids 23, one for each arresting plunger, these solenoids being included in an electric circuit which is adapted to be closed automatically at the start of turning the handle 25 which is preferably of dielectric material, the starting torque of the cock 5 being greater than that required for continued operation after withdrawal of the arresting plungers from engaged position. The handle 25 has electric contact finger 26 in constant engagement with the annular electro-conductor ring 27 which is located upon the dielectric support 28 upon which the handle 25 is rotatably mounted and within easy reach of the operator, the support being mounted for instance as part of the panel board of the pilot's cabin, as indicated by reference letter P. There is a source of electric current 29 in the circuit which includes the ring 27 and the solenoids 23, the other side of the solenoids being grounded. Although only one plunger and solenoid unit is indicated in the circuit illustrated in Fig. 3 of the present drawings, it is to be understood that all of the plunger and solenoid units are included in the same circuit, as will be readily understood from the present disclosure. The finger 26 has electric connection with the electric conductor bar 30 which is mounted upon the dielectric handle 25 and which is adapted to be brought into electric contact with either of the electro-conductive arms 31 mounted upon the metal post 32; this post being rotatable within the support 28, and the handle 25 being rotatably mounted within the hollow post 32. The post 32 is connected to the shaft 14 for rotative adjustment thereof and this side of the electric circuit also is grounded.

Figures 4, 5:
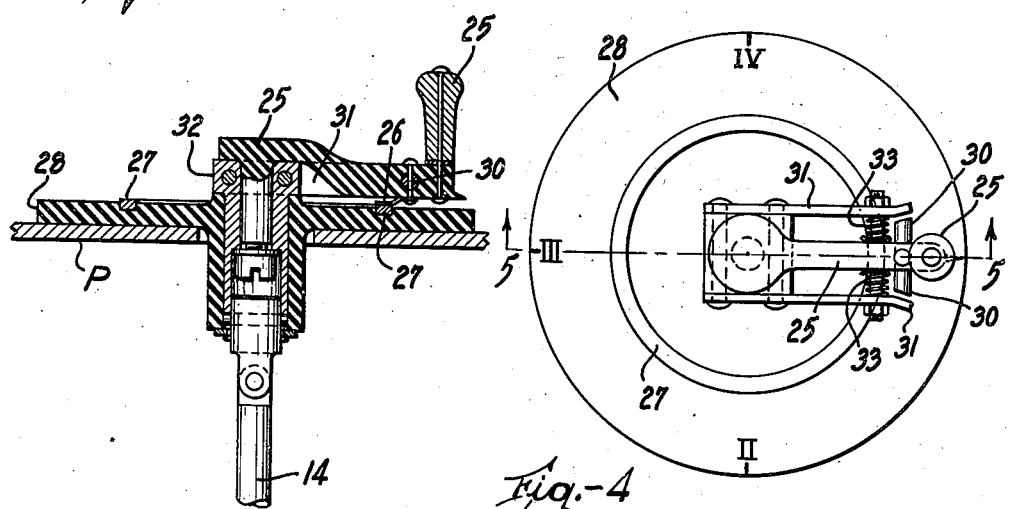
Fig. 4 is a top plan view of the control means for the selector cock.
Fig. 5 is a view taken on line 5—5 of Fig. 4.

The handle 25 is normally held in middle position, as indicated in Fig. 4 of the present drawings, by means of the coiled springs 33 or other suitable means arranged between the sides of this handle and the arms 31. But, when the starting torque is first applied in an attempt to turn the cock 5, the handle 25 alone will be moved because of the great initial resistance to such turning movement, as above explained; and such movement of the handle 25 will bring the contact 30 into engagement with one of the contact arms 31, thereby closing the circuit through the solenoids 23 for withdrawal of the arresting plungers 21 from engaged position. While withdrawal of the plungers reduces substantially the resistance to the adjustment of the cock 5, yet the remaining resistance thereto is still sufficient to hold the electric circuit closed through the solenoids until the cock 5 has been turned sufficiently to bring the recesses 22 out of the region of their arresting plungers 21.

These parts are so constructed and arranged that the handle 25, when only normal turning effort is required, will occupy neutral or floating position between the springs so as to hold the bar 30 in middle or idle position and hence not in electric contact with either of the arms 31, as in Fig. 4 of the present drawings. The plungers 21 then, under the influence of the springs 21a thereof, ride on arcs of concentric circles with a minimum of resistance, as the hollow shaft 14 continues to be turned, and are ready to drop back into the recesses or seats 22 when brought into registry therewith and to thereby arrest the turning motion with the full force of the springs 21a of the arresting plungers 21.

The angular movement of the handle 25 alone, as the initial step in the operation of this device, is made possible by the combined resistance to the turning of the shaft 14, which is greater than the resistance of springs 33, as above explained. According to my present invention, the resistance between the plungers 21 and their seats 22 is first relieved by automatically withdrawing the plungers 21 immediately upon application of starting torque to the handle 25, as explained; and a further small amount of motion then raises the stem 11 due to the wedge action of the serrations 17 and 18 so as to relieve the compression of the sealing material, the cock 5 being raised against the tension of spring 8. These two factors appreciably reduce the resistance, and the handle 25 and the bar 30 will then assume floating position between the arms 31 so as to break the electric circuit through the solenoids; and such condition will continue throughout the remainder of the turning movement of shaft 14. As a result, the plungers 21 are released from the holding influence of the solenoids and are then ready to snap back into engagement with their notches or seats to arrest the rotative movement of the shaft 14 exactly when it has been continued to the point of full registry of the desired ports.

The rotative movement of shaft 14, upon withdrawal of plungers 21, will effect a wedging action between the companion sets of serrations 17 and 18 with the result that the stem 11 and its cock 5 will be lifted to a predetermined extent so as to reduce the frictional engagement between the cock and the sealing means against which it seats, but without breaking the seal therebetween and thus without permitting leakage of gasoline at any time. Then, when the upper flanged end 16 of the stem 11 abuts the stop 19, there will be no further axial movement of stem 11, there being then established firm interengagement between the sets of serrations 17 and 18 so as to thereafter effect only rotative movement of the stem 11 and its cock 5 upon continued rotation of shaft 14, such turning of the cock 5 serving to bring it to the desired position. When the shaft 14 has been turned sufficiently to come close to the next position of registry of the cock 5, the recesses or seats 22 will again come before the plungers which will then snap into engagement therewith so as to thereby locate and secure the cock 5 in its newly established position where it will remain until again changed in the manner above described.

It is to be understood that the notches or serrations 17 and 18 may be so designed as to permit the cock 5 to be turned in either direction with the same degree of efficiency.

When the spring plungers 21 start to snap into locking position, as above explained, this will help to turn the shaft 14, as will be observed by the operator who may at once discontinue the application of turning force to the handle 25; whereupon there is no longer any wedging action between the notches 17 and 18 to hold the stem 11 and its cock 5 in raised position, with the result that the cock is then free to be lowered by the influence of the spring 13 so as to again occupy fully seated position.

By virtue of the wedge form of the companion serrations 17 and 18, the spring 13 will prove effective at once in bringing the cock 5 to fully lowered position and there is no danger of the cock remaining in raised position. That is, the serrations or notches 17 and 18 are of sufficiently steep pitch to ensure such immediate and complete lowering of the cock 5; and yet the pitch of these serrations is such as to permit relative movement between the same in order to effect the raising of the stem 11 and the cock 5 in the manner above described and before rotation of the shaft and its cock is started. According to the present form of illustration, these serrations 17 and 18 are shown as having an angle of approximately 45 degrees although I do not mean to limit the invention to this particular angle. The clearance between these serrations, as above mentioned, is also an important factor in this connection.

The location of the notches or seats 22 for the arresting plungers 21, the location of the ports in the cock with respect to those in the casing, and the engagement of the serrations 17 and 18 are all so constructed and arranged that, when the plungers have fully entered their seats and the cock 5 has been fully lowered, there will always be ensured a perfect registry between the port in the cock and that in the casing to which it has been moved for communication therethrough. The clearance between the sets of companion serrations 17 and 18, as above explained, is an important factor in this connection also.

Thus it will be seen that, in my present device, part of the resistance to the rotary adjustment is first and at once relieved, then the cock is lifted so as to reduce the resistance still further and at the same time to avoid turning against the compressed sealing means, and finally the cock is turned. This series of movements is initiated at once upon attempting to turn the handle 25 and they are carried out in this sequence without any particular attention by the operator. Then, when the desired position has been reached for the cock, the return of the plungers to their notches tends to assist in the remaining turning operation, which will be noticed by the operator, and the full seating of the plungers will tend to stop such rotary movement of the cock. Release of the handle 25 will permit the cock 5 to come to fully lowered position.

It is to be noted that the raising and lowering of the cock 5 take place while the cock is otherwise in still position and thus the sealing material is not subjected to the deforming action that would otherwise result from such movements of the cock while being rotated. That is to say, the partial and full engagement between the cock 5 and its sealing material is, in each instance, effected along a substantially rectilinear path.

Also the danger of deforming the sealing material is still further reduced by having the same of continuous and smooth form so that there are no edges that can bulge into the holes of the cock, to be sheared when these holes are sealed over. The raised portion 6a of the sealing material also serves as a means of ensuring dependable sealing effect and relieving friction during the rotative adjustment of the cock. Furthermore, this form of sealing means ensures a kneading action therein which means that the sealing material will not lose its normal sealing effectiveness and that its life of usefulness will be prolonged. Also, by precluding the danger of deformation or undue wear of the sealing material, there is ensured practically no loss of liquid even when under high pressure.

With my form of sealing means, as herein set forth, there is precluded the necessity of having blind ports which are provided in other devices of this same general nature; and I regard that as an important improvement in the art.

By reducing to a minimum the resistance during the rotary adjustment of the cock 5, it is possible to employ this device with remote control with a high degree of efficiency and dependability at all times.

With my present improved form of device, there is ensured maximum flow of the liquid with minimum resistance to such flow, emphasis being placed in this connection upon the means which I have provided for ensuring full registry of the ports and complete sealing of the cock.

Also, the angular form of the notches or serrations 17 and 18 ensures opening of the cock in an efficient manner and ensures also immediate return of the cock to fully lowered position without any danger of sticking. Likewise, these wedge-like serrations 17 and 18 prove most efficient in relieving the engagement of the cock with its sealing material, as above explained.

By virtue of my particular arrangement and operation of the two series of companion notches or serrations 17 and 18, it is possible to employ a large number of comparatively shallow notches which can be produced more economically than a few comparatively deep notches and which will afford a greater aggregate bearing surface, and also will not be subject to wear and consequent loss of accuracy which would result from notches of comparatively deep form.

Furthermore, the interengagement between the two sets of serrations 17 and 18 serves to hold the cock in the position to which adjusted; and this is true also of the engagement of the plungers in their seats. Then, too, by virtue of the initial release of the plungers, as herein provided, they may be designed with greater holding force than would otherwise be possible. Likewise, there can be provided sufficient pressure for complete sealing engagement of the cock with its sealing material, more so than would otherwise be possible, since part of this pressure is relieved in an efficient manner before initiating rotary adjustment of the cock; and thus there is no danger of the rotary adjustment being hindered by such effective pressure of the cock against its seat, especially in view of my particularly efficient and dependable means embodied in the wedge-like serrations 17 and 18, as herein disclosed.

Instead of the hand crank or handle 25, there may be provided a crank and suitable connections for operation by a small electric motor together with a conveniently located electric switch for control thereof.

Thus my present form of device, by virtue of the specific features herein emphasized, meets the requirements of aircraft as above pointed out, although the use of this device is not to be understood as being limited to any particular field of activity.

Furthermore, this device is of simple construction, it can be easily manipulated, it is of light weight, it can be easily manufactured, installed, removed, repaired, and is dependable in its operation even to the extent of the rigid requirements of aircraft, as above explained.

What I claim is:

1. In a liquid control device, the combination of a valve seat of conical form with a plurality of ports therethrough, a continuous conical ring of resilient sealing material upon said valve seat, said sealing ring having an annular raised portion continuously thereabout and having apertures therethrough in said raised portion and corresponding with said ports, a valve of conical form for seating upon said raised portion and having ports corresponding with those of said valve seat, and means for effecting pressure of said valve upon said sealing material so as to compress said annular raised portion.

2. In a liquid control device, the combination of a valve seat of conical form with a plurality of ports therethrough, a continuous conical ring of resilient material upon said valve seat, said sealing ring having an unconfined annular raised portion continuously thereabout and having apertures through said raised portion corresponding with said ports, a valve of conical form for seating upon said raised portion and having ports corresponding with those of said sealing ring and said valve seat, and means for effecting pressure of said valve upon said raised portion and for relieving such pressure during the seating and adjustment of said valve, respectively, so as to thereby effect a kneading of said unconfined raised portion of the sealing material.

3. In a valve structure, the combination of a valve seat, a valve therefor adjustable from one position to another, means for holding said valve in adjusted position, means for adjusting said valve, electric means for rendering said holding means ineffective, and an electric switch adapted to control the actuation of said electric means, said switch being co-ordinated with said valve-adjusting means for closing momentarily by the initiatory movement of said valve-adjusting means.

4. In a valve structure, the combination of a valve seat, a valve therefor adjustable from one position to another, means for holding said valve in adjusted position, means for adjusting said valve, said valve-adjusting means including a forked lever and an operating crank therefor, resilient means between the two sides of said crank and the forks of said lever so as to provide a floating arrangement for said crank during application of normal force thereto for adjustment thereof, electric means for rendering said holding means ineffective, said lever and crank having companion electric contacts for controlling the circuit of said electric means and adapted to be closed by the application of extraordinary force upon said crank in the direction of operation thereof.

5. In a valve structure, the combination of a valve seat, a valve therefore rotatably adjustable from one position to another, resilient sealing means between said valve and its seat, means for arresting and holding said valve in adjusted position, means for adjusting said valve, said arresting and holding means and said sealing means together constituting a combined resistance to the adjusting operation of said valve when in seated position, said valve-adjusting means including a forked lever and an operating crank therefor, resilient means between the two sides of said crank and the forks of said lever so as to provide a floating arrangement for said crank during application of normal torque thereto for adjustment thereof, electric means for rendering said arresting and holding means ineffective, said lever and crank having companion electric contacts for controlling the circuit of said electric means and adapted to be closed by application of extraordinary torque to said crank as occasioned by said combined resistance, said parts being so constructed and arranged that relief of part of said combined resistance, including that incident to said arresting and holding means, will permit said electric contacts to open so as to release said arresting and holding means for return to effective condition upon movement of said valve to proper position therefor.

6. In a liquid control device, the combination of a valve seat, a valve therefor rotatably adjustable from one predetermined position to another, spring-actuated plunger and detent means for locating and holding said valve successively in such positions, means for withdrawing said plunger means so as to facilitate movement of said valve from one position to another, means for effecting adjustment of said valve, means, actuated automatically by the initiation of the operation of said valve-adjusting means, for effecting the actuation of said withdrawing means and for releasing the same after such withdrawal so as to return the same to the influence of its spring action and thereby prepare the same for automatic engagement with another detent means when the valve has been moved to the extent of bringing the plunger and detent means again into co-operative relation.

7. In a liquid control device, the combination of a valve seat, said valve seat being of conical form and having a plurality of ports therethrough, a continuous conical ring of resilient sealing material upon said valve seat, said sealing ring having an annular raised portion continuously thereabout and having apertures through said raised portion corresponding with said ports, a valve of conical form for seating upon said raised portion and having ports corresponding with those of said valve seat, means for effecting pressure of said valve upon said sealing material so as to compress said annular raised portion, means for holding said valve in adjusted position, means, actuated automatically by the initiation of the operation of said valve-adjusting means, for rendering said holding means ineffective, said valve having a stem provided with annularly arranged series of plain-faced wedge-like notches, an adjusting member rotatable in a fixed path and provided with annularly arranged companion series of plain-faced, wedge-like notches capable of inter-engaging relation to those of said valve stem, whereby initiation of the rotation of said adjusting member will release said holding means and will produce wedging action between said series of notches and thereby cause substantially straight-line movement of said valve for partially relieving the pressure of said sealing means, means for limiting such straight-line movement of said valve to a predetermined extent so as to maintain inter-engagement between said series of notches for torque transfer and so as to maintain a seal for said valve, whereby continued rotation of said adjusting member will effect rotatable adjustment of said valve without breaking the seal of said valve.

8. In a liquid control device, the combination of a member having a valve seat of conical form with a plurality of ports therethrough, a valve member of conical form therefor having ports corresponding with those of said valve seat member, a continuous conical ring of resilient sealing material upon one of said members and having an annular raised portion continuously thereabout and having apertures therethrough in said raised portion corresponding with the ports of said members, and means for effecting pressure of said valve member upon said valve seat member so as to compress said annular raised portion.

9. In a liquid control device, the combination of a member having a valve seat of conical form with a plurality of ports therethrough, a valve member of conical form for said valve seat member and having ports corresponding with those of said valve seat member, a continuous conical ring of resilient sealing material upon one of said members, said ring having an unconfined annular raised portion continuously thereabout and having apertures therethrough in said raised portion and corresponding with the ports in said members, and means for effecting pressure of said valve member upon said valve seat member and for relieving such pressure during the seating and adjustment of said valve member, respectively, so as to thereby effect a kneading of said unconfined raised portion of the sealing material.

OTTO M. BURKHARDT.